(12) United States Patent
Laskin et al.

(10) Patent No.: US 6,425,349 B1
(45) Date of Patent: Jul. 30, 2002

(54) BICYCLE PET CARRIER

(75) Inventors: Barbara Laskin, 505 E. 79th St., Apt. 7M, New York, NY (US) 10021; Agostinho Martins, Fresh Meadows, NY (US)

(73) Assignee: Barbara Laskin, New York, NY (US)

( * ) Notice: Subject to any disclaimer, the term of this patent is extended or adjusted under 35 U.S.C. 154(b) by 0 days.

(21) Appl. No.: 09/881,130

(22) Filed: Jun. 14, 2001

(51) Int. Cl.[7] .................................................. A01K 1/00
(52) U.S. Cl. ....................................................... 119/496
(58) Field of Search ................................ 119/496, 482, 119/453, 771; 224/412, 421, 422, 431, 424, 435

(56) References Cited

U.S. PATENT DOCUMENTS

| | | |
|---|---|---|
| 482,938 A | 9/1892 | Blood |
| 530,160 A | 12/1894 | Coulson |
| 2,079,851 A | 5/1937 | Glenny ........................ 224/36 |
| 4,010,880 A | 3/1977 | Guillot-Munoz ..... 224/42.42 A |
| 4,010,888 A * | 3/1977 | Gilbert ....................... 229/52 B |
| D276,713 S | 12/1984 | Schacter ..................... D12/158 |
| 5,024,359 A * | 6/1991 | Thomas ......................... 224/36 |
| 5,277,148 A * | 1/1994 | Rossignol et al. ............ 119/19 |
| 5,282,554 A * | 2/1994 | Thomas ......................... 224/36 |
| 5,406,816 A * | 4/1995 | Thomas ..................... 62/457.1 |
| 5,487,554 A * | 1/1996 | May ............................ 280/293 |
| 5,577,646 A | 11/1996 | White ......................... 224/422 |
| 5,718,191 A * | 2/1998 | O'Donnell ................. 119/771 |
| 5,785,003 A | 7/1998 | Jacobson et al. ........... 119/496 |
| 5,832,874 A | 11/1998 | Ravin ......................... 119/496 |

\* cited by examiner

*Primary Examiner*—Peter M. Poon
*Assistant Examiner*—Susan Piascik

(57) ABSTRACT

A pet carrier for attaching to the front of a bicycle comprises a housing having a substantially flat bottom, a side wall enclosure and an open top, and a support structure for supporting the housing and connecting the housing to a bicycle. The support structure has two hooks attached to a rear portion of the structure. The hooks are spaced so that each hook is placeable over one handlebar of a bicycle to support the pet carrier on the front of the bicycle. To further balance the pet carrier, there is a strut attached to a bottom portion of the support structure for resting on a head tube of the bicycle.

11 Claims, 4 Drawing Sheets

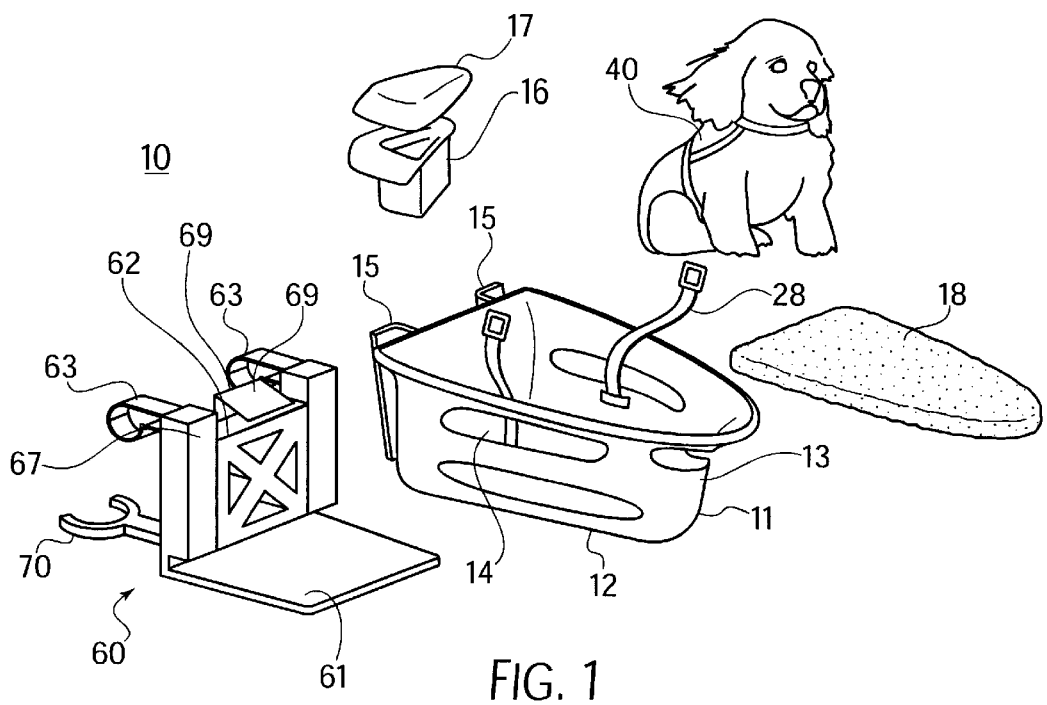
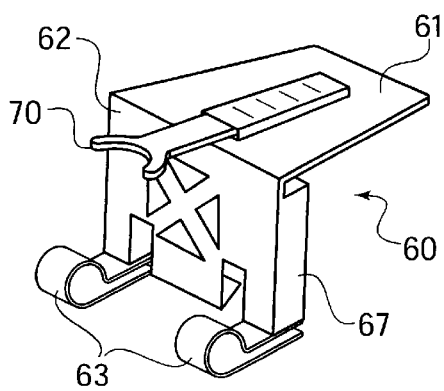
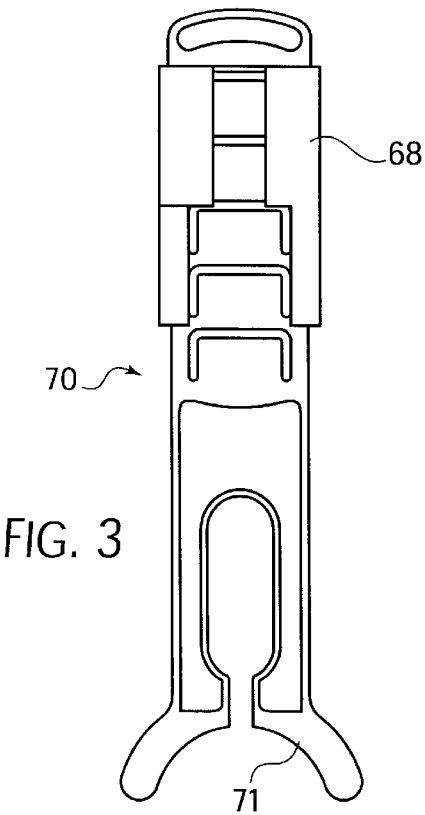

US 6,425,349 B1

BICYCLE PET CARRIER

BACKGROUND OF THE INVENTION

1. Field of the Invention

This invention relates to a pet carrier for use on a bicycle. In particular, the invention relates to a pet carrier for small animals that is attached to the handlebars of a bicycle.

2. The Prior Art

It is often desirable to bring one's pet along when traveling by bicycle. There have been several attempts in the past to construct pet carriers for bicycles so that small pets, such as small dogs, can travel with the owner.

U.S. Pat. No. 5,577,646 to White discloses a pet carrier for a bicycle that is attached to a frame that is affixed over the rear wheel of a bicycle. Another such pet carrier is disclosed in U.S. Pat. No. 5,832,874 to Ravin. U.S. Pat. No. Des. 276,713 to Schacter discloses another similar pet carrier.

Various baskets for the front of a bicycle are disclosed in U.S. Pat. No. 530,160 to Coulson and U.S. Pat. No. 482,938 to Blood.

Pet carriers for automobiles are shown in U.S. Pat. No. 4,010,880 to Guillot-Munoz and U.S. Pat. No. 5,785,003 to Jacobson et al.

None of the above-mentioned pet carriers are suitable for comfortably and safely transporting a small pet on the front of a bicycle, where the pet is in full view of the rider.

SUMMARY OF THE INVENTION

It is therefore an object of the invention to provide a pet carrier that safely and comfortably transports a small pet on the front of a bicycle.

It is another object of the invention to provide a pet carrier of the type mentioned above that is simple and quick for consumers to attach to their bicycles.

It is another object of the invention to provide a front-mounted carrier in which the pet is always in full view of the bicycle rider. This arrangement is preferable to rear-mounted carriers in which the pet is riding behind the rider, and is difficult to see, and therefore, nearly impossible for the rider to safely deal with a pet's misbehavior or distress if the pet is riding behind the rider.

These and other objects are accomplished by a pet carrier according to the invention comprising a housing which holds the dog and having a substantially flat bottom, a side wall enclosure and an open top, with two integral brackets at a rear portion of the side wall enclosure. There is a housing support with two integral hooks that clamp around the bicycle handlebars to support the housing which holds the pet. The housing is attached to the rear of the housing support, which has a strut that rests on the head tube of the bicycle. There is a harness, which is preferably attached via a clip or hook, which fastens to two sides of the wall enclosure of the housing, and which in turn secures and supports the pet.

There is preferably removable padding inserted along the bottom enclosure of the housing, to create a more comfortable environment for the pet. The housing also has a plurality of ventilation holes or slots therein to allow air to pass through the housing.

There are two containers, which will fit inside molded compartments on the inside of the housing for the further comfort and well being of the pet. These containers have lids and can contain water and food.

The pet carrier is ideal for transporting small dogs, such as the Maltese, Coton de Tulears, West Highland Terrier and Chihuahua, but other pets, such as cats could also use the pet carrier.

The housing preferably has a triangular shaped bottom, which is an aerodynamic and comfortable shape for the pet. Preferably, the triangle has rounded sides. One flat side of the triangle abuts the bicycle front, while a narrow angle points outward. Other shapes could also be envisioned.

There is an optional canopy removably connected to the housing, for protecting a pet inside from the elements. The canopy is preferably made of a breathable and washable material, such as nylon. Other materials could also be used.

The housing of the pet carrier is preferably formed from a molded plastic, which is lightweight but strong. However, other materials such as fiberglass or metal could also be used. The padding is preferably foam or fabric-covered batting, or a combination of the two, but again, any suitable material could be used.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows an exploded view of the pet carrier according to the invention;

FIG. 2 shows a bottom view of the support assembly;

FIG. 3 shows a bottom view of the strut for attachment to the support assembly;

DETAILED DESCRIPTION OF THE PREFERRED EMBODIMENT

Figure 4:
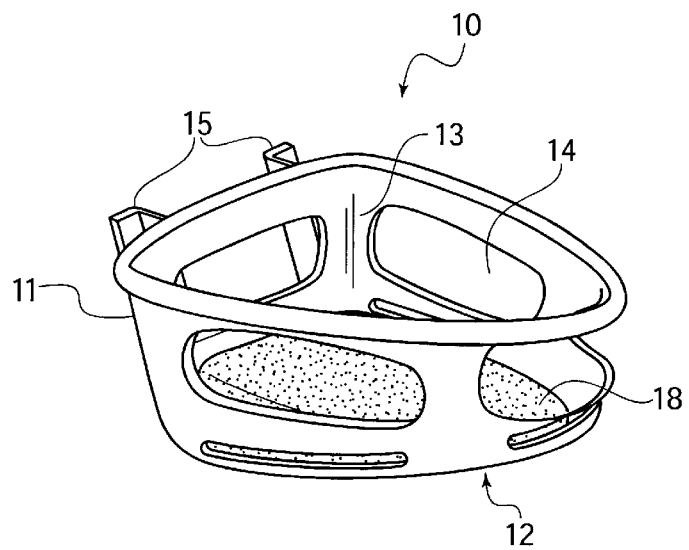
FIG. 4 shows a perspective view of the housing of the pet carrier.

Referring now in detail to the drawings, FIG. 1 shows an exploded view of the pet carrier 10 according to the invention. Pet carrier 10 comprises has a housing 11 and a support assembly 60. Housing 11 has a substantially flat bottom 12, a side wall enclosure 13 and an open top, as also shown in FIG. 4. Housing 11 is substantially triangular in shape for aerodynamic and aesthetic purposes. Side wall enclosure 13 has a plurality of ventilation holes 14 throughout, to allow ventilation of the interior of housing 11 while in use. There are 2 flanges 15 mounted to the back of housing 11 for attachment to support structure 60. Housing 11 is equipped with removable padding 18 on the bottom thereof, to cushion a pet while riding in pet carrier 10.

In addition, there are removable food/water compartments 16 having covers 17 situated within housing 11. Housing 11 could have recesses in bottom 12 (not shown) for accommodating compartments 16.

Figure 6:
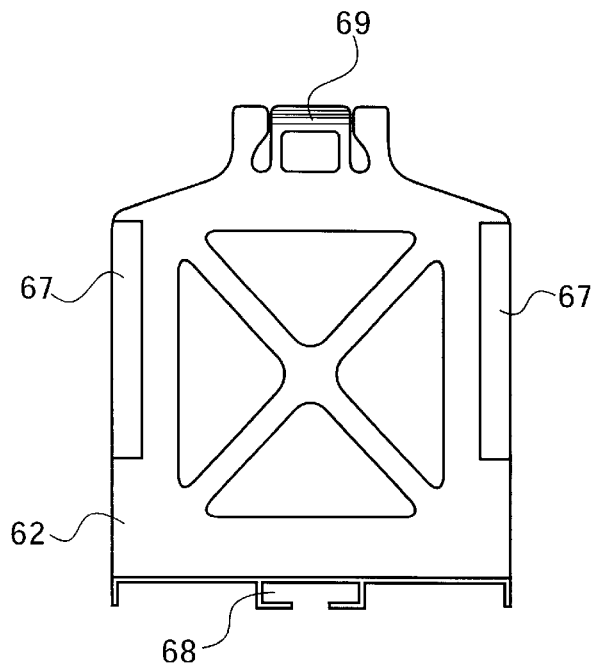
FIG. 6 shows a front view of the back of the support assembly.

Rear wall 62 has two grooves 67, shown in FIGS. 1 and 6, which allow flanges 15 to slide therein to secure housing 11 to support structure 60. In addition, a latch 69 snaps over the top edge of housing 11 to further secure housing 11 to support structure 60.

Figure 5:
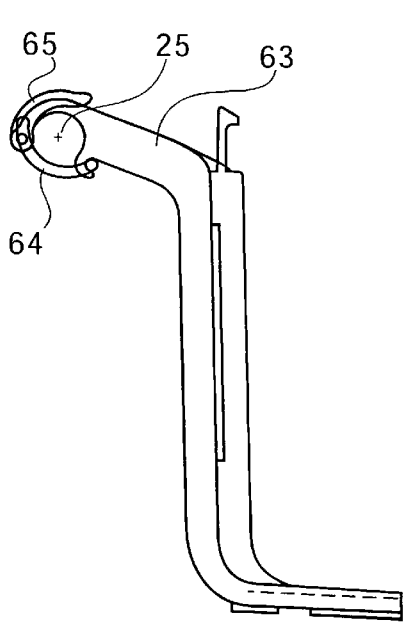
FIG. 5 shows a side cross-sectional view of one of the hooks of the support assembly.
Figure 7:
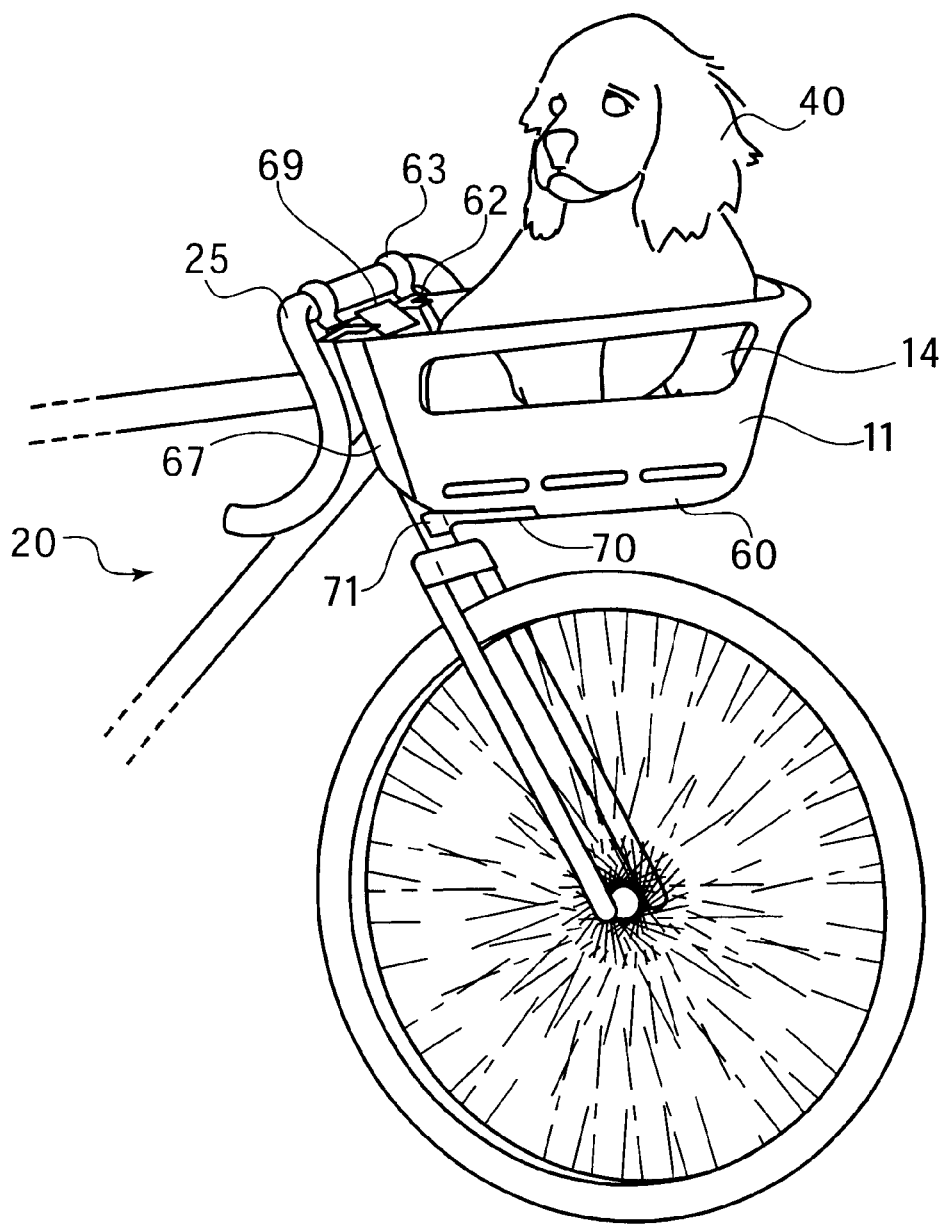
FIG. 7 shows the pet carrier with a pet seated therein and mounted to a bicycle.

Support structure 60 comprises a rear wall 62 and a flat bottom 61. There are two hooks 63 attached to rear wall 62 for attachment to handlebars 25 of a bicycle 20, as shown in FIGS. 5 and 7. Hooks 63 are spaced so that each hook is placed over handlebar 25 without interfering with cables present at the front of bicycle 20 to support pet carrier 10 thereon. FIG. 5 shows a detailed view of hook 63. Hook 63 has a hinged arm 64 that allows hook 63 to be placed over handlebar 25. Hinged arm 64 is then pivoted shut by lever clamp 65, to lock hook 64 to handlebar 25 during use. To release hook 63, clamp 65 is released. Hooks 63 are attached to rear wall 61 of support assembly 60.

As shown in FIGS. 1–3, there is a strut 70 attached to bottom 61 of support structure 60. Strut 70 has a U-shaped end 71 for abutting the head tube 26 of a bicycle 20, shown in FIG. 7. There are cut-out flexible tabs 73 for adjustably affixing strut 70 to bottom 61, through slot 68. This allows a proper weight balance to be achieved, since each bicycle and each pet are different and can affect the balance of the carrier differently. Since strut 70 merely rests against head tube 26, it allows bicycle 20 to be easily maneuvered without pet carrier 11 interfering with the function of the bicycle.

Figure 8:
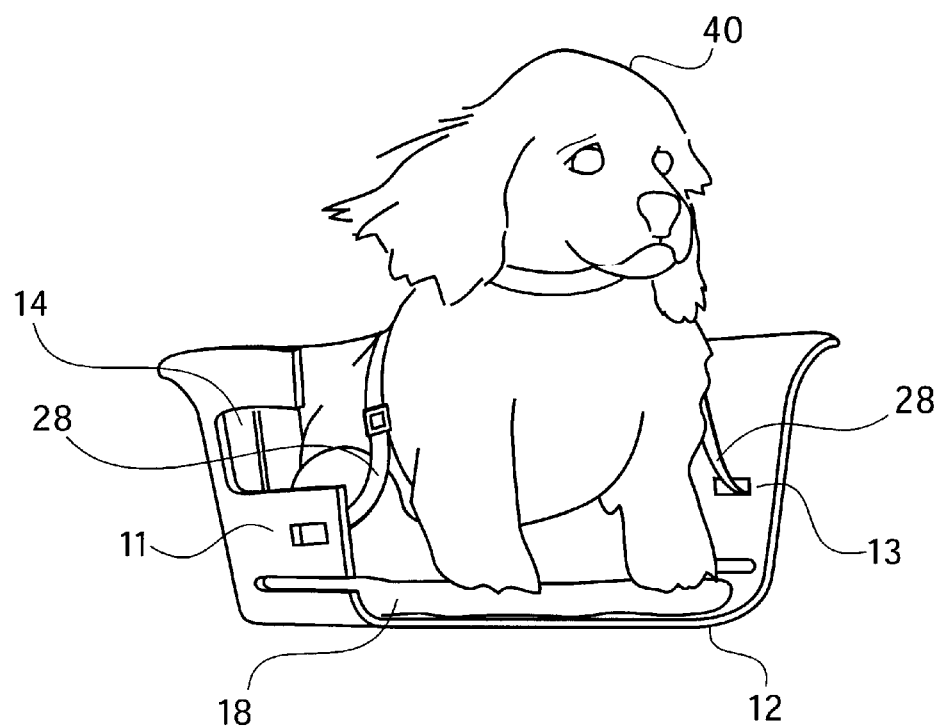
FIG. 8 shows a partial cross-sectional view of the housing showing a harness system.

FIG. 8 shows a harness 28 attached to sidewalls 13 of pet carrier 10, for securing pet 40 to pet carrier 10 while in use. Harness 28 is removable from pet.

Figure 9:
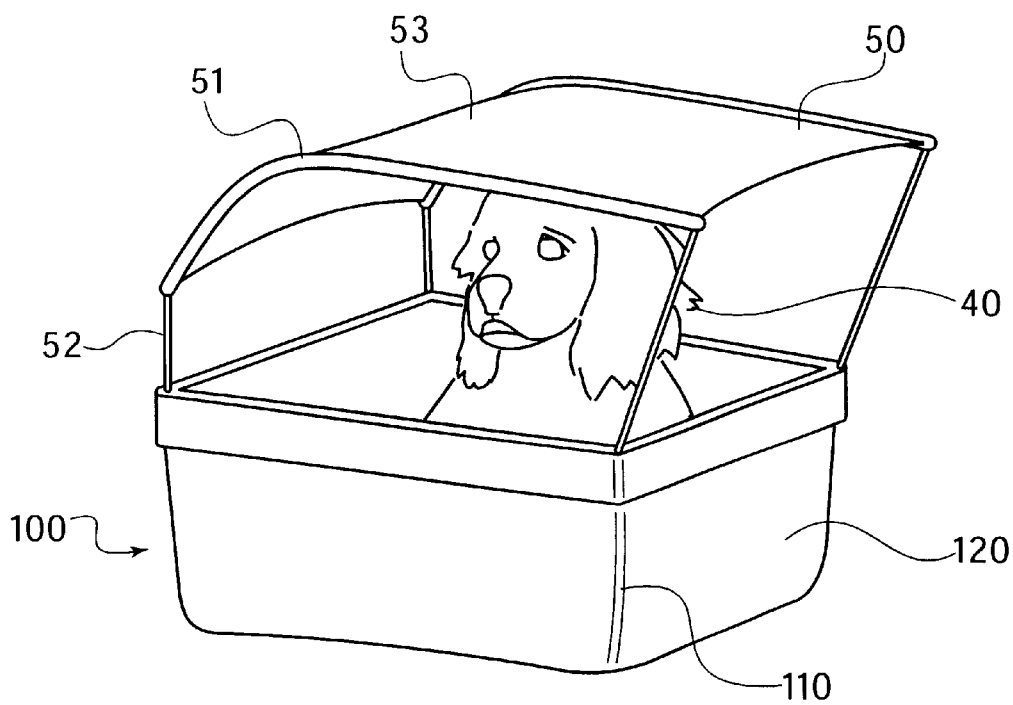
FIG. 9 shows a perspective view of another embodiment of the housing of the pet carrier with a removable canopy attached.

FIG. 9 shows an alternative embodiment of the invention. Here, pet carrier 100 is rectangular in shape and is made of a metal frame 110 covered by breathable fabric 120. There is a canopy 50 for shading pet 40 from sun and rain. Canopy 50 is comprised of side ribs 51, between which a fabric 53 is mounted. Fabric 53 is preferably water resistant, but should be breathable and washable. A suitable fabric is nylon, but other fabrics could also be used. Canopy 50 is supported on pet carrier 100 by a plurality of posts 52. Other types of canopies could also be used. In addition, the embodiment shown in FIGS. 1–4 could also be equipped with a suitable canopy. Canopy 50 is preferably removable.

Accordingly, while only a few embodiments of the present invention have been shown and described, it is obvious that many changes and modifications may be made thereunto without departing from the spirit and scope of the invention.

What is claimed is:

1. A pet carrier attachable to the front handlebars of a bicycle, comprising:
   a housing having a substantially flat bottom, a side wall enclosure and an open top; and
   a support assembly removably connected to said housing and comprising:
      at least one hook attached to a rear portion of said support assembly, said hooks spaced so that each hook is placeable over the handlebar of a bicycle to support said pet carrier thereon;
      a strut attached to a bottom portion of said support assembly, said strut having a free end for resting against a head tube of the bicycle to support said pet carrier; and
      a latch attached to a top of said rear wall of said support structure for snapping over a top edge of said housing to secure said housing to said support structure.

2. The pet carrier according to claim 1, further comprising removable padding inserted along said bottom of said housing.

3. The pet carrier according to claim 1, further comprising a harness removably attached to said side wall for restraining a pet placed inside said pet carrier.

4. The pet carrier according to claim 1, wherein the housing is triangular in shape.

5. The pet carrier according to claim 1, further comprising a canopy removably connected to said housing, for protecting a pet inside from weather.

6. The pet carrier according to claim 5, wherein said canopy is made of a breathable and washable material.

7. The pet carrier according to claim 1, further comprising removable compartments for storing food and water within said housing.

8. The pet carrier according to claim 1, wherein said strut is adjustably attached to the bottom of said support structure.

9. The pet carrier according to claim 1, wherein said strut has a U-shaped free end for abutting the head tube of a bicycle.

10. The pet carrier according to claim 1, wherein said housing has at least one flange attached to a rear portion of said sidewall enclosure and wherein said support assembly has a rear wall having at least one groove, and wherein said flange slides within said groove to attach said housing to said support structure.

11. The pet carrier according to claim 1, wherein each hook comprises a stationary hook portion for placing over a handlebar, a hinged arm portion connected to the hook portion, and a lever clamp connected to said hook and arm portions for clamping the arm portion around the handlebar.

* * * * *